3,356,757
HYDROCARBON CONVERSION
James F. Roth and Andrew R. Schaefer, St. Louis, Mo., assignors to Monsanto Company, St. Louis, Mo., a corporation of Delaware
No Drawing. Filed Sept. 23, 1964, Ser. No. 398,778
14 Claims. (Cl. 260—683.3)

ABSTRACT OF THE DISCLOSURE

A process for the dehydrogenation of acyclic paraffin hydrocarbons of six to thirty carbon atoms per molecule comprising contacting the acyclic paraffin hydrocarbons at a temperature of 400 to 600° C. with a catalyst comprising approximately 2 to 20% by weight of molybdenum, as an oxide, deposited on an inert carrier, the catalyst having a surface area of no greater than 100 square meters per gram.

---

The present invention relates to the conversion of hydrocarbons. More particularly, the present invention relates to a catalyst and process for the catalytic dehydrogenation of saturated hydrocarbons to unsaturated hydrocarbons.

For the dehydrogenation of saturated hydrocarbons, many catalytic agents have been proposed. Among these catalytic agents are the oxides, sulfides and other compounds of metals from Group VI B of the Periodic Table, particularly chromium and molybdenum. It has been suggested that these catalytic agents may be deposited on inert carriers such as silica, alumina, silica-alumina, magnesia-alumina and the like. In investigating known catalyst compositions containing these catalytic agents, reasonably good yields and conversion of saturated hydrocarbons are obtained. However, the amount of coking resulting from dehydrogenation with these catalysts severely restricts their practical use in dehydrogenation processes. Coking results in lower conversions and also increases cycle time due to the increased time necessary to reactivate the catalyst. Attempts to reduce coking by use of milder dehydrogenation conditions with these catalysts results in some reduction in coke formation but also results in substantially reduced conversions, still leaving these catalysts commercially impractical.

It is an object of the present invention to provide a new and improved catalyst and process for the conversion of hydrocarbons. Another object of the present invention is to provide a new and improved catalyst and process for the dehydrogenation of saturated hydrocarbons. A further object of the present invention is to provide a new and improved catalyst and process for the dehydrogenation of saturated hydrocarbons whereby coke formation is substantially reduced without significant reduction in yields and conversions. Additional objects will become apparent from the following description of the invention herein disclosed.

The present invention, which fulfills these and other objects, comprises a catalyst and process for the dehydrogenation of saturated hydrocarbons to principally mono-ethylenically unsaturated hydrocarbons, the catalyst comprising approximately 2 to 20 percent by weight of a metal from Group VI B of the Periodic Table, as an oxide, deposited on an inert carrier, said catalyst having a surface area of no greater than 100 square meters per gram.

The process of the present invention comprises contacting saturated hydrocarbons with the above defined catalyst of the present invention at elevated temperatures, thereby converting saturated hydrocarbons to mono-ethylenically unsaturated hydrocarbons without undue side reactions and with substantially reduced coke formation, and recovering a product containing a substantial quantity of mono-ethylenically unsaturated hydrocarbons. The process of the present invention results in the conversion of saturated hydrocarbons to mono-ethylenically unsaturated hydrocarbons with substantially reduced coke formation without sacrifice of yields and conversions and while maintaining undesired side reactions at a minimum.

In order to further describe and to illustrate the present invention, the following non-limiting examples are presented.

Example I

A catalyst was prepared by saturating approximately 600 grams of an alumina having a surface area of approximately 80 square meters per gram with a solution of 81 grams of ammonium molybdate dissolved in 208 mls. of water to be completely adsorbed by the alumina. The wetted alumina was then dried at about 110° C. for approximately 10 hours and then calcined in air for 12 hours at 500° C. The resulting catalyst contained approximately 6.7 percent by weight of molybdenum, present as $MoO_3$ and had a surface area of 75 square meters per gram.

To demonstrate the unexpected advantage derived from the catalyst prepared above in accordance with the present invention, this catalyst, hereinafter designated Catalyst A, was compared in the present dehydrogenation process with three more conventional catalysts, hereinafter designated Catalysts B, C and D. Catalysts B, C, and D were prepared in substantially the same manner as Catalyst A with the exception that the alumina used in the catalyst preparation of these catalysts had surface areas of about 160, 150 and 250 square meters per gram, respectively. Catalyst B had a final surface area of 150 square meters per gram, Catalyst C a final surface area of 140 square meters per gram and Catalyst D a final surface area of 240 square meters per gram.

A feed consisting of 8 mole percent n-hexane in helium was passed into contact with equal amounts of each of the catalysts at the same flow rate. The temperature within each of the reaction chambers was approximately 470° C. and the pressure substantially atmospheric. After about 20 hours reaction was stopped and the amount of carbon formation during the runs determined. The following table presents the amount of carbon formed with each of the catalysts.

| Catalyst: | Weight percent carbon |
|---|---|
| A | 5.4 |
| B | 10.4 |
| C | 9.6 |
| D | 8.3 |

From the above comparative data, it is seen that coking or carbon formation is substantially reduced through use of the catalyst of the present invention.

Example II

Normal-dodecane was dehydrogenated by contact with Catalyst A of Example I in the following manner: n- dodecane and steam in a mole ratio of steam to dodecane of 4:1 was contacted with the catalyst at a temperature of approximately 470° C. at substantially atmospheric pressure for about 2.5 seconds. The space velocity of the n-dodecane-steam mixture was approximately 0.43 liquid volume per hour per volume of catalyst. The following table presents the results of the dehydrogenation runs after 25 hours in operation.

| Composition of Product | Mole Percent |
|---|---|
| Mono-olefins | 8.7 |
| Di-olefin, Tri-olefin | 3.1 |
| Aromatic | |
| Low Boilers* | 2.2 |
| Mono-olefin Yield | 62.2 |

*Cracked products boiling below n-dodecane.

In the general practice of the present invention the metal from Group VI B of the Periodic Table is one selected from the group consisting of chromium, molybdenum, and tungsten. Of course, combinations of these metals may be used also. Most often the metal from Group VI B of the Periodic Table used in preparing the catalyst of the present invention is either chromium, molybdenum or a combination of these. However, in the preferred practice of the present invention, molybdenum is the metal of Group VI B of the Periodic Table used in the present catalysts. Though reference is made above to the use of metal from Group VI B of the Periodic Table, this is not to be construed as teaching the existence of these metals in the metallic state in the catalyst of the present invention. Rather, these metals exist in the oxide state as will be noted from the discussion of the method of preparation of the present catalysts herein presented.

The amount of the metal from Group VI B of the Periodic Table in the catalyst of the present invention is usually within the range of 2 to 20 percent by weight of the total catalyst composition. Preferably, however, the amount of this metal or combination of such metals is such as to comprise 3 to 10 percent by weight of the total catalyst.

One of the most important limitations on the catalyst of the present invention is that of surface area. The present catalysts are low in surface area, preferably having a surface area no greater than 100 square meters per gram. Similar catalysts having greater surface areas have been found to produce excessive coke formation when used in the dehydrogenation process disclosed herein. The preferred catalysts of the present invention have a surface area of from 10 to 100 square meters per gram.

To meet the surface area limitations set forth above, a low surface area carrier or support is most often used in the preparation of the present catalysts. Preferably, in preparing the present catalysts, an alumina support having a surface area no greater than 100 square meters per gram is used. However, other support materials such as silica, silica-alumina, magnesia-alumina, magnesia and the like may be used as support materials for the present catalysts. A particularly preferred support material for the present catalysts is an alumina having a surface area of 10 to 100 square meters per gram.

The procedure for preparing the catalyst of the present invention is not particularly critical if the carrier or support used is one meeting the above defined preferred surface area qualifications. If carriers or supports having surface areas greater than these limitations are used, it will be necessary either to pretreat the carrier material to reduce its surface area or to treat the finished catalyst to reduce its surface area. Usually, the carrier or support is pretreated since to treat the finished catalyst often results in an unnecessary loss of a portion of the impregnating metal. Methods of treating both supports and finished catalysts to reduce their surface area are well known to those skilled in the art.

The catalysts of the present invention may be prepared by impregnation of a support or by co-precipitation of molybdenum and alumina. After the compositing of the mixed oxides, the preparation is dried at 100 to 150° C. for several hours. After this drying step the catalyst is subjected to oxidation conditions in the presence of oxygen or an oxygen containing gas such as air. The oxidation conditions usually comprise temperatures of 300 to 600° C. for 1 or more hours. After the oxidation treatment, the catalyst is ready for use in the present process.

The temperature at which the present dehydrogenation process is operated is relatively critical. Generally, it is necessary to maintain elevated temperatures within the range of 400 to 600° C. Preferably, the dehydrogenation temperatures of the present process are within the range of from about 420 to 480° C. Optimum temperatures are related to space velocity, the optimum temperature increasing as the space velocity increases. Usually, the space velocities of the hydrocarbon within the dehydrogenation zone are within the range from approximately 0.1 to 2.0 liquid volumes of feed per hour per volume of catalyst. A preferred space velocity is one of from about 0.2 to 1.0 liquid volume of feed per hour per volume of catalyst.

Pressures at which the present dehydrogenation process is operable may include subatmospheric, atmospheric or superatmospheric pressures, usually ranging from subatmospheric up to 50 p.s.i.g. It is preferred to operate the present process at or near atmospheric pressure, e.g. 0 to 10 p.s.i.g.

The saturated hydrocarbons which may be dehydrogenated in accordance with the present invention include cyclic, branched-chain and straight-chain paraffin hydrocarbons. Such paraffin hydrocarbons may range from those of 2 carbon atoms per molecule up to those of 40 carbon atoms and greater. The upper limitation of 40 carbon atoms is one primarily of practicality since paraffin hydrocarbons of a greater number of carbon atoms may be dehydrogenated with the present process, however, with such higher molecular weight feeds, there is an increase in side reactions and also an increase in the physical difficulty of handling such feeds. Exemplary but not limiting of paraffin hydrocarbons which may be dehydrogenated in accordance with the present invention are ethane, propane, n-butane, iso-butanes, n-pentane, isopentanes, cyclopropane, cyclobutane, cyclopentane, cyclohexane, methylcyclopentane, n-hexane, iso-hexanes, n-heptane, iso-heptanes, n-octane, iso-octanes, n-nonane, iso-nonanes, n-decane, iso-decanes, n-undecane, iso-undecanes, n-dodecanes, iso-dodecanes, n-tridecane, iso-tridecanes, n-tetradecane, iso-tetradecane, n-pentadecane, iso-pentadecanes, n-hexadecane, iso-hexadecanes, cycloheptane, methyl cyclohexane, cyclo-octane, ethylcyclohexane, decahydronaphthalene, dicyclopentane, etc. The present invention finds its most advantageous use in the dehydrogenation of paraffin hydrocarbons of 6 to 30 carbon atoms, preferably those which are straight-chain or branched-chain. The advantage of such utilization of the present invention results from the fact that excessive cyclization and cracking of acyclic paraffin hydrocarbons does not occur as is the case with many dehydrogenation catalyst and processes which are useful for the dehydrogenation of low molecular weight paraffin hydrocarbons such as propanes and butanes. Further, many catalysts useful for the dehydrogenation of low molecular weight paraffin hydrocarbons give poor yields and conversions when used for the dehydrogenation of higher molecular weight paraffin hydrocarbons such as those of 10 carbon atoms and above. In its preferred and most useful application, the present catalyst and process is directed to the dehydrogenation of straight-chain paraffin hydrocarbons of 10 to 20 carbon atoms per molecule.

The use of diluents in the present process is optional, through somewhat better results are obtained when diluents are used. Among the diluents which may be used in the present invention are steam, nitrogen, hydrogen, methane and the like. The preferred diluent is steam. If a diluent is used, it generally is used in a mole ratio to the hydrocarbon feed of from approximately 1:1 to 5:1, preferably of from approximately 2:1 to 5:1.

The design and arrangement of equipment for carrying out the present process is not particularly critical. It is only necessary that good engineering practices be followed in both the design and arrangement of equipment.

What is claimed is:

1. The process for the dehydrogenation of acyclic paraffin hydrocarbons of 6 to 30 carbon atoms which comprises contacting said acyclic paraffin hydrocarbons at an elevated temperature of 400 to 600° C. with a catalyst comprising approximately 2 to 20 percent by weight of molybdenum, as an oxide, deposited on an inert carrier, said catalyst having a surface area of greater than 100 square meters per gram.

2. The process of claim 1 wherein the amount of molybdenum present in the catalyst is approximately 3 to 10 percent by weight of the total catalyst.

3. The process of claim 1 wherein the inert carrier is one having a surface area of no greater than 100 square meters per gram.

4. The process of claim 3 wherein the inert carrier is alumina.

5. The process of claim 1 wherein the saturated hydrocarbons are contacted with said catalyst at a pressure within the range of from subatmospheric up to 50 p.s.i.g.

6. The process of claim 1 wherein the saturated hydrocarbons are contacted with said catalyst at a space velocity of approximately 0.1 to 2.0 liquid volumes of feed per hour per volume of catalyst.

7. The process of claim 1 wherein said saturated hydrocarbons are contacted with said catalyst in the presence of steam in a mole ratio of steam to said hydrocarbons of from approximately 1:1 to 5:1.

8. A process for the dehydrogenation of n-paraffin hydrocarbons of 6 to 30 carbon atoms which comprises contacting said n-paraffin hydrocarbons with a catalyst comprising approximately 2 to 20 percent by weight of molybdenum, as an oxide, impregnated upon alumina, said catalyst having a surface area of no greater than 100 square meters per gram, at a temperature of 400 to 600° C., a pressure within the range of from subatmospheric up to 50 p.s.i.g. and at a space velocity of approximately 0.1 to 2.1 liquid volumes of feed per hour per volume of catalyst.

9. The process of claim 8 wherein the amount of molybdenum present in the catalyst is from 3 to 10 percent by weight of the total catalyst.

10. The process of claim 8 wherein the pressure is substantially atmospheric.

11. The process of claim 8 wherein said saturated hydrocarbons are contacted with said catalyst in the presence of steam in a mole ratio of steam to said hydrocarbons of from approximately 1:1 to 5:1.

12. The process of claim 8 wherein the alumina is one having a surface area of no greater than 100 square meters per gram.

13. The process of claim 8 wherein the elevated temperature is within the range of from 420 to 480° C.

14. The process of claim 8 wherein said n-paraffin hydrocarbons have 10 to 20 carbon atoms per molecule.

References Cited
UNITED STATES PATENTS

| | | | |
|---|---|---|---|
| 2,800,518 | 7/1957 | Pitzer | 260—683.3 |
| 3,088,986 | 5/1963 | Stevenson | 260—683.3 |
| 3,189,661 | 6/1965 | Mulaskey et al. | 260—683.3 |

DELBERT E. GANTZ, *Primary Examiner.*

C. E. SPRESSER, *Assistant Examiner.*